(12) United States Patent
Sugimoto et al.

(10) Patent No.: US 7,537,372 B2
(45) Date of Patent: May 26, 2009

(54) BACK LIGHT DEVICE AND LIQUID CRYSTAL DISPLAY DEVICE

(75) Inventors: Yasushi Sugimoto, Tsukuba (JP); Teruo Teshima, Chikusei (JP); Masato Taya, Tsukuba (JP); Toshikatsu Shimazaki, Chikusei (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 10/582,960

(22) PCT Filed: Dec. 16, 2004

(86) PCT No.: PCT/JP2004/018809

§ 371 (c)(1),
(2), (4) Date: Jun. 15, 2006

(87) PCT Pub. No.: WO2005/061957

PCT Pub. Date: Jul. 7, 2005

(65) Prior Publication Data

US 2007/0139956 A1 Jun. 21, 2007

(30) Foreign Application Priority Data

Dec. 19, 2003 (JP) ............................. 2003-422836

(51) Int. Cl.
*F21V 8/00* (2006.01)
(52) U.S. Cl. .................... 362/619; 362/617; 362/620
(58) Field of Classification Search ............... 362/620, 362/619, 617, 249; 349/70
See application file for complete search history.

(56) References Cited

U.S. PATENT DOCUMENTS

| 6,595,652 | B2 * | 7/2003 | Oda et al. .................... 362/609 |
| 2006/0171167 | A1 * | 8/2006 | Ohkawa ..................... 362/620 |

FOREIGN PATENT DOCUMENTS

| CN | 1266997 | 9/2000 |
| CN | 1319779 | 10/2001 |
| CN | 1078335 | 1/2002 |

(Continued)

OTHER PUBLICATIONS

Supplementary European Search Report, for Application No. EP 04 80 7168, dated Feb. 1, 2007.

(Continued)

*Primary Examiner*—Laura Tso
(74) *Attorney, Agent, or Firm*—Antonelli, Terry, Stout & Kraus, LLP.

(57) ABSTRACT

A backlight device with improved efficiency in the utilization of light and a liquid crystal display device providing this backlight device are provided, the backlight device comprising at least a light source 2, a light guide plate 1 and a reflector 10, in which the light guide plate 1 further provides an entry face 5 into which light from the light source is incident, a lower face 4 substantially perpendicular to the entry face 5 and that opposes the reflector 10, and an upper face 3 that opposes the lower face 4, and reflective elements 6 that are capable of reflecting such that light is emitted from the lower face 4 toward the reflector 10 are disposed on the upper face 3 of the light guide plate.

30 Claims, 14 Drawing Sheets

FOREIGN PATENT DOCUMENTS

| | | | |
|---|---|---|---|
| JP | 2000-211426 | | 8/2000 |
| JP | 2000-222924 | | 8/2000 |
| JP | 2001-143512 | | 5/2001 |
| JP | 2002-124114 | | 4/2002 |
| JP | 2003-107465 | * | 4/2003 |
| WO | PCT/JP 2004/002741 | * | 4/2004 |
| WO | 2004/079258 A1 | * | 9/2004 |

OTHER PUBLICATIONS

Chinese Official Action dated Aug. 8, 2008, for Application No. 2004800374856.

Taiwanese Official Action dated Apr. 25, 2008, for Application No. 01151.

Korean Official Action dated Apr. 16, 2008, for Application No. 10-2006-7014530.

Chinese Official Action dated Jan. 16, 2009, for Application No. 2004800374856.

* cited by examiner (a)

(b)

(a)

(b)

(a)

(b)

BACK LIGHT DEVICE AND LIQUID CRYSTAL DISPLAY DEVICE

TECHNICAL FIELD

The present invention relates to a backlight device that illuminates liquid crystal display elements or the like from the rear and a liquid crystal display device that provides this back light device and liquid crystal display elements.

BACKGROUND ART

In conventional art a liquid crystal display device provides the display device used for a mobile telephone or the like. In this kind of liquid crystal display device a backlight device providing a light source together with a light guide plate that guides light emitted from this light source is used in order to provide illumination from the rear face of liquid crystal display elements.

FIG. 1 provides an external view of a conventional light guide plate. FIG. 1 (*a*) provides a view of the light guide plate from above, FIG. 1 (*b*) provides a side view of the light guide plate and FIG. 1 (*c*) provides a perspective view of the light guide plate. In those drawings the light source is provided by light emitting diode 102.

The light guide plate 101 is comprised of a transparent material such as PMMA or polycarbonate or the like and has a substantially flat, planar form. The upper face of the light guide plate 101 comprises the exit face 103, the lower face comprises the reflective face 104 and one of the side faces comprises the entry face 105. Reflective elements 106 that operate to reflect light incident to the entry face 105 toward the exit face 103 are formed on the reflective face 104.

Light output from the light emitting diode 102 light source enters the light guide plate 101 from the entry face 105 and proceeds within the light guide plate 101 continually undergoing total reflection at the exit face 103 and the reflective face 104 until the angle of the exit face 103 and the reflective face 104 reaches a critical angle. The reflective elements 106 formed on the reflective face 104 perform the role of deflecting light in the direction of the exit face 103. Light traveling in the light guide plate 101 is deflected in the direction of the exit face 103 as it is reflected at the reflective elements 106 and exits from the exit face 103 if the angle formed between traveling direction of light and the exit face 103 exceeds a critical angle. The light guide plate 101 in which light input from the entry face 105 comprising a side face is output from the exit face 103 comprising the main face is called a side edge type, and is widely used for mobile telephone devices and the like.

FIG. 2 is a cross section showing the condition of usage of a conventional light guide plate and backlight device.

The light guide plate 101 is arranged such that directly below the liquid crystal display elements 107, the exit face 103 is disposed opposing the lower face 109 of the liquid crystal display elements 107 with the optical sheet 108 positioned between the exit face 103 and that lower face. In the light guide plate 101, light from the light emitting diode 102 enters from the entry face 105.

Light from the entry face 105 incident to the light guide plate 101 travels inside the light guide plate 101 while undergoing total reflection at the exit face 103 and the reflective face 104 until the angle between traveling direction of light and the exit face 103 reaches a critical angle. The reflective elements 106 formed on the reflective face 104 fulfill the role of deflecting the light in the direction of the exit face 103. The reflective elements 106 formed on the reflective face 104 perform the role of deflecting light in the direction of the exit face 103. Light traveling in the light guide plate 101 is deflected in the direction of the exit face 103 as it is reflected at the reflective elements 106 and exits from the exit face 103 if the angle formed between traveling direction of light and the exit face 103 exceeds a critical angle.

Light output from the exit face 103 of the light guide plate 101 enters the lower face 109 of the liquid crystal display elements 107 via the optical sheet 108. The optical sheet 108 directs the light output from the light guide plate 101 up in the direction of the liquid crystal display elements 107 such that the light is incident vertically to the lower face 109 of the liquid crystal display elements 107.

Further, part of the light that enters the light guide plate 101 is output from the reflective face 104 when the angle formed between itself and the reflective face 104 exceeds a critical angle. In order to reuse this leaked light a reflector is disposed positioned opposing the reflective face of the light guide plate. The light leaked from the light guide plate is reflected at this reflector and enters from the reflection face of the light guide plate once again before being output from the exit face of the light guide plate.

Patent documents disclosing this conventional art include for example Japanese Unexamined Patent Application Publication No. 2000-222924 and Japanese Unexamined Patent Application Publication No. 2000-211426.

DISCLOSURE OF THE INVENTION

As shown in FIG. 1 and FIG. 2, in the case of conventional art the general structure is such that the reflective elements 106 formed on the light guide plate 101 are disposed on the reflective face 104 that opposes the exit face 103 of the liquid crystal display elements 107 side, and light output from the exit face 103 is input to the lower face 109 of the liquid crystal display elements 107 via the optical sheet 108.

FIG. 3 is a plan view showing the distribution of light output from a light guide plate of conventional art.

Here for example, light output from the light emitting diode 102 light source enters the light guide plate 101 via the entry face 105, however in the region of the entry face 105 a light ray from the light emitting diode 102 point light source, spreads out in a fan shape as it is guided inside the light guide plate 101 and dark regions 113 occur in the area between the neighboring light emitting diodes 102. Further, light from light emitting diodes 102 may be subject to bright line 112 or hotspots 111 such as pulsating shades of light or the appearance eyeball like glows or the like in the vicinity of the entry face 105 due to the intensity of the light rays.

The results of analysis of hotspots 111 and bright line 112 are that these arise chiefly in light emitted from the exit face after repeatedly undergoing total reflection at the exit face and the reflective face of a light guide plate, and it has been observed that in the case of leaked light that comes emitted via a reflector and is leaked from a reflective face of a light guide plate, the effects of hotspots 111 and bright line 112 are weak.

The present invention is proposed in the light of the above described conditions and has as its objectives, the provision of a backlight device with improved light usage efficiency and a liquid crystal display device providing this backlight device.

In order to overcome the above described issues the backlight device related to the present invention has at least a light source, a light guide plate and a reflector, the light guide plate providing an entry face on a side face thereof and reflective elements on the upper face of the side facing the liquid crystal display elements.

This arrangement for a backlight device means that part of light that is emitted from the exit face without having traveled via a reflector that gives rise to hotspots and bright line as occurs in the case of a conventional configuration, can then be once guided to a reflector. This light once guided to a reflector is then reflected at that reflector, passes through the light guide plate and is emitted from the exit face of the light guide plate, before being deflected at an optical sheet and input to liquid crystal display elements. In this way the volume of light once traveling via a reflector is increased and the unevenness of light intensity giving rise to hotspots and bright line is alleviated.

To describe this in another way, when in the above described light guide plate according to this invention the total volume of light output from the exit face is A and the volume of light from among that total volume of light that is output from the lower face of the light guide plate in the direction of the reflector is B, the relational expression $B \geq 0.25A$ is fulfilled, and it is possible to realize a backlight device in which the unevenness of light intensity giving rise to hotspots and bright line is alleviated.

In other words, in the case of a conventional backlight device, the concept is that as the light guide plate lower face is made the reflective face, light emitted from the light guide plate lower face is "leaked light," and a reflector is used to prevent, even if only a little bit, the leaked light from being wasted. In contrast to this concept, in the case of the light guide plate according to the present invention, the volume of light traveling in the direction of the reflector from the light guide plate lower face is made to increase, thus this new light guide plate is based on a technical concept different to the conventional art.

The backlight device related to this invention has at least a light source, a light guide plate and a reflector, the light guide plate providing an entry face to which light from the light source is incident, a lower face substantially perpendicular to this entry face and opposing the reflector and an upper face opposing the lower face. This light guide plate guides light entering therein from the entry face such that this light undergoes total reflection between the upper face and the lower face, with reflective elements that reflect the light such that the light is output from the lower face toward the reflector being formed on that upper face, integrally with the light guide plate.

It is preferable that reflective grooves that reflect light output from the lower face of the light guide plate to the light guide plate side be disposed on the surface of the reflector.

Further, it is preferable for a metallic film to be disposed on the face of the reflector.

Moreover, it is preferable for the light guide plate to be comprised of polymethyl metacrylate, a polyolefine resin, polycarbonate or a compound of these.

Again, it is preferable that the distance between the upper face and the lower face of the light guide plate be 0.3-3.0 mm.

It is also preferable that the reflective elements be formed by disposing a plurality of V-shaped grooves on the upper face of the light guide plate substantially parallel to the entry face.

It is preferable that the reflective elements comprise the first face that is inclined toward the side of the light guide plate closest to the light source when viewed from inside the light guide plate and the second face that is inclined toward the face opposite the light source when viewed from inside the light guide plate, and the angle θ1 formed between the first face and the upper face is 0.2-5° and the angle θ2 formed between the second face and the upper face is not more than 90°.

Further, it is preferable that an anisotropic diffusion pattern be formed as an integrated body with the lower face of the light guide plate.

Again, it is preferable that the anisotropic diffusion pattern be a surface relief hologram.

Moreover, it is preferable that an optical sheet that deflects light emitted from the light guide plate such that the approach of the traveling direction of the light is the direction normal to the upper face of the light guide plate be disposed in a position opposing the upper face of the light guide plate.

The liquid crystal display device related to the present invention has this backlight device and liquid crystal display elements illuminated by this backlight device.

The present invention realizes a backlight device and liquid crystal display device that uses light more efficiently.

BEST MODE FOR CARRYING OUT THE INVENTION

Figure 1:
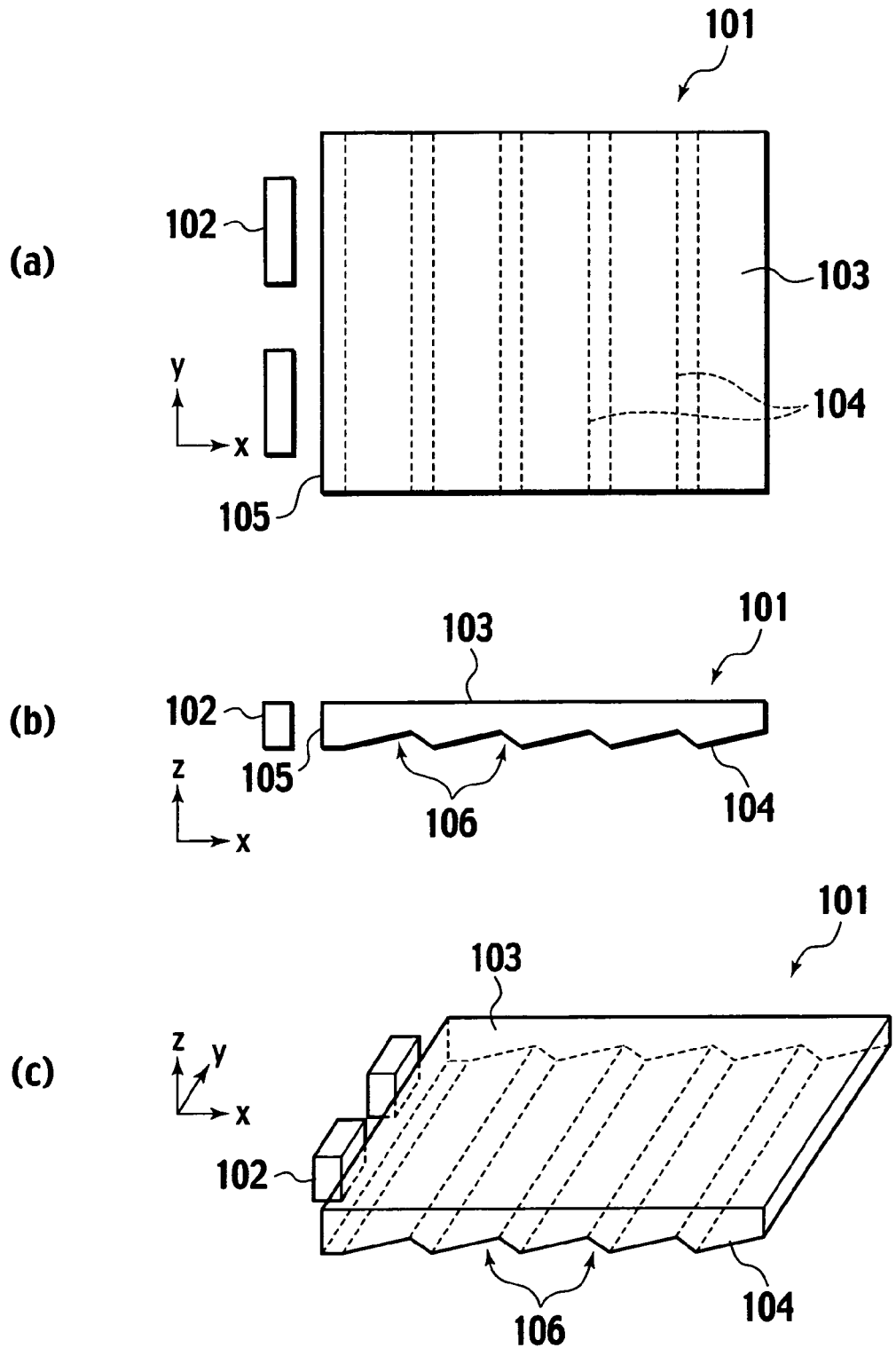
FIG. 1 provides an external view of a conventional light guide plate.
Figure 2:
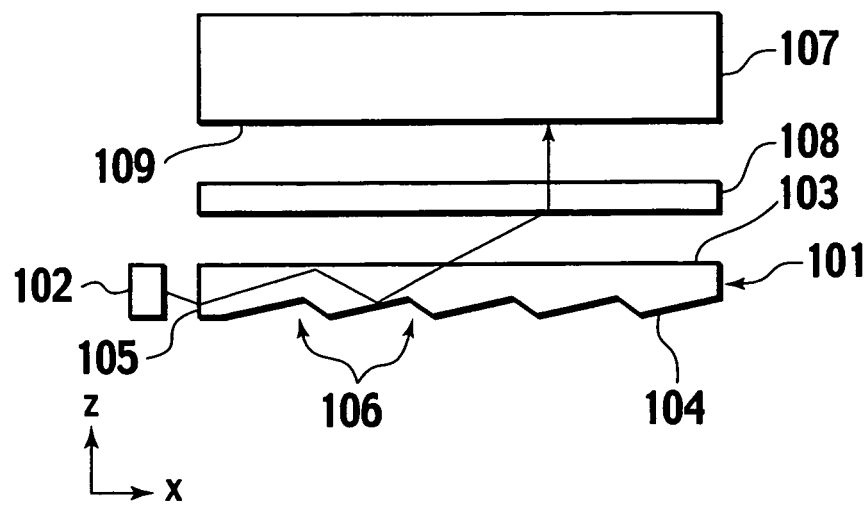
FIG. 2 is a cross-sectional view showing the condition of usage of a conventional light guide plate and backlight device.
Figure 3:
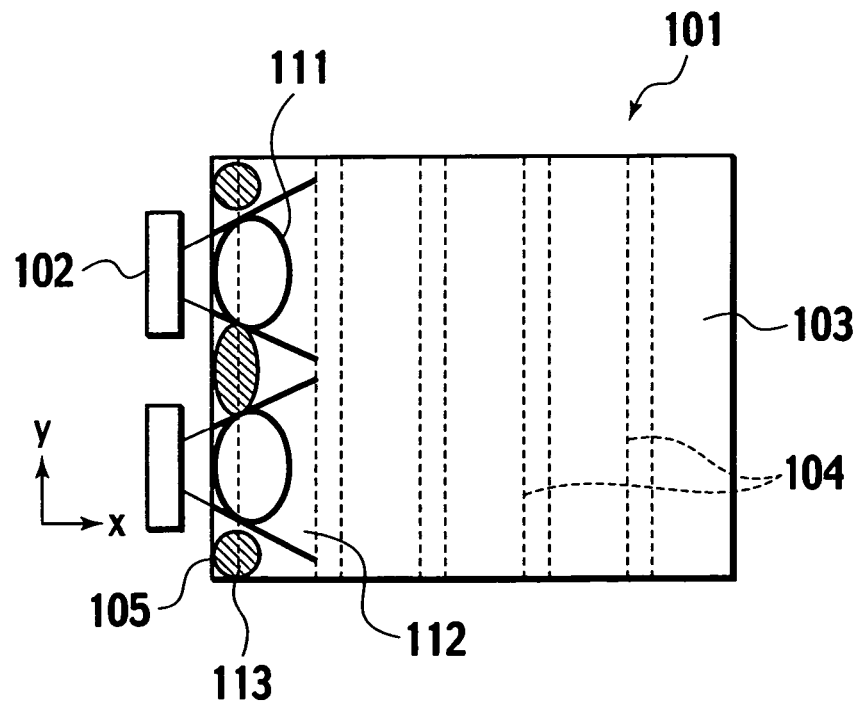
FIG. 3 is a plan view showing the distribution of light emitted from a conventional light guide plate.

An embodiment of the light guide plate and backlight device according to the present invention will now be described with reference to the drawings.

For simplicity, in these drawings, like reference numerals identify like elements. Further, the drawings of the embodiments of the present invention are provided in order to illustrate the content of the invention but are not intended to accurately reflect the relative proportions of each of the parts.

To enable ease in referencing, an orthogonal xyz coordinate system is set over some of the drawings. The x-axis and the y-axis are set in the two sides of the upper face and the lower face of the light guide plate in the direction of travel of light in the light guide plate, and the z-axis is set in the direction of the normal to the upper face and the lower face. Further, the positive and negative directions of the z axis are termed upwards and downwards.

Figure 4:
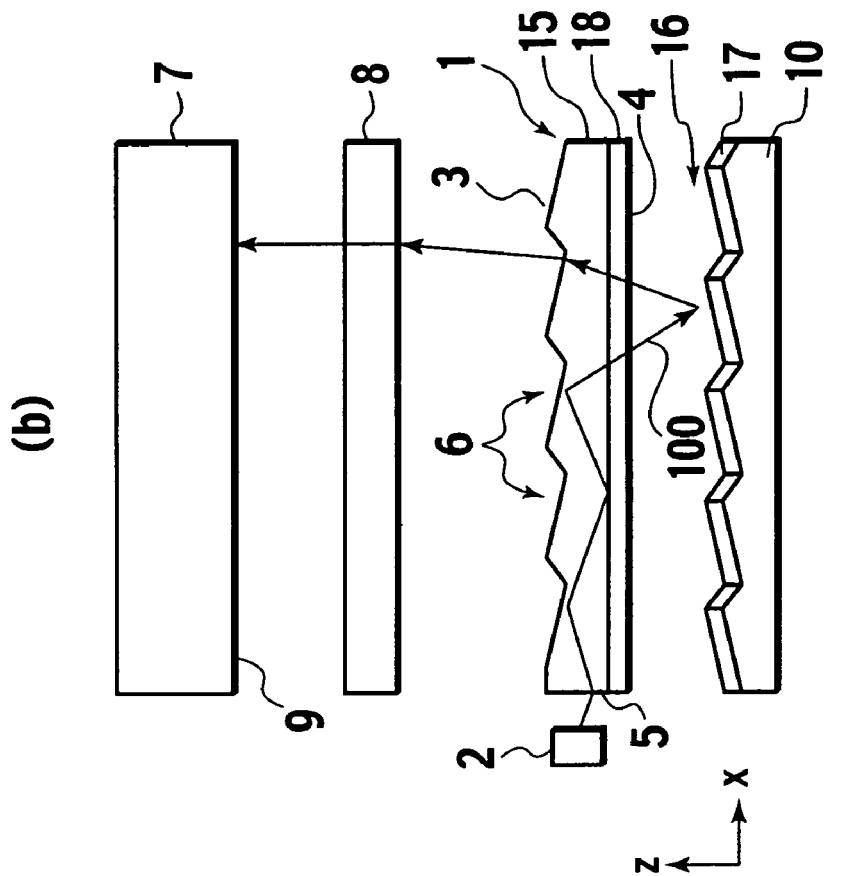
FIG. 4 shows the configuration of the liquid crystal display device according to an embodiment of the present invention.
Figure 4:
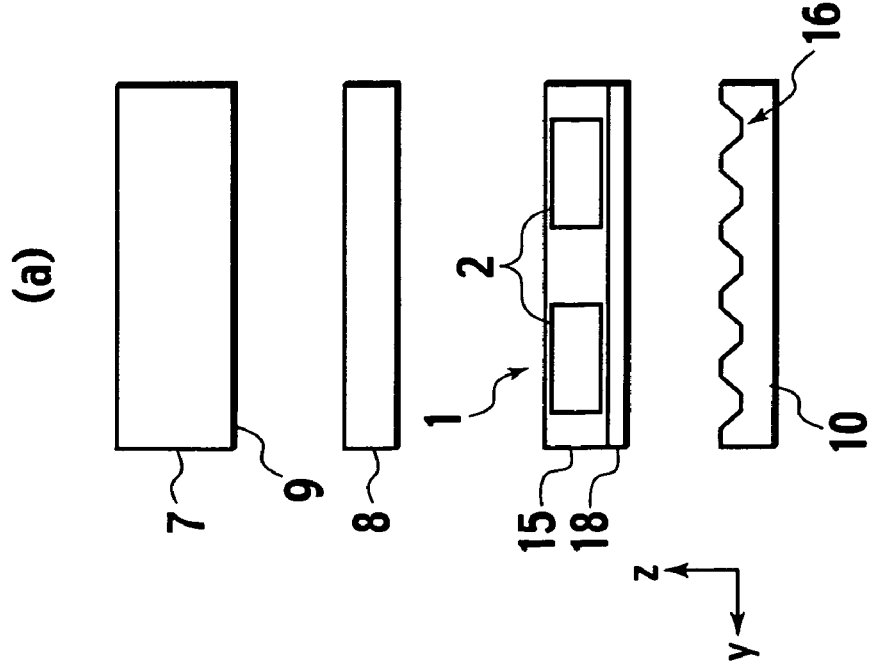

FIG. 4 shows the configuration of the liquid crystal display device according to an embodiment of the present invention. FIG. 4 (a) is a side view from that side of the device nearest the light emitting diode light source; FIG. 4 (b) is a side view from a perpendicular direction to FIG. 4 (a).

This liquid crystal display device provides a light emitting diode 2 light source, a light guide plate 1 that guides a light ray 100 that enters therein from the light emitting diodes 2, a reflector 10 disposed substantially parallel to the light guide plate 1, that reflects the light ray 100 emitted from the light guide plate 1, an optical sheet 8 disposed substantially parallel to and directly above the light guide plate 1 with the light guide plate disposed between itself and the reflector 10, that operates to direct a light ray 100 that has been reflected at the reflector 10 and has passed the light guide plate 1, in the direction of the liquid crystal display elements 7, and the liquid crystal display elements 7 disposed substantially parallel to the light guide plate 1 in a position opposing the light guide plate 1 with the optical sheet 8 between the light guide plate 1 and itself, into which a light ray 100 from the optical sheet 8 enters.

Within this liquid crystal display device the light emitting diodes 2, the light guide plate 1, the reflector 10 and the optical sheet 8 comprise a backlight device that illuminates the liquid crystal display elements 7 from the rear.

Figure 5:
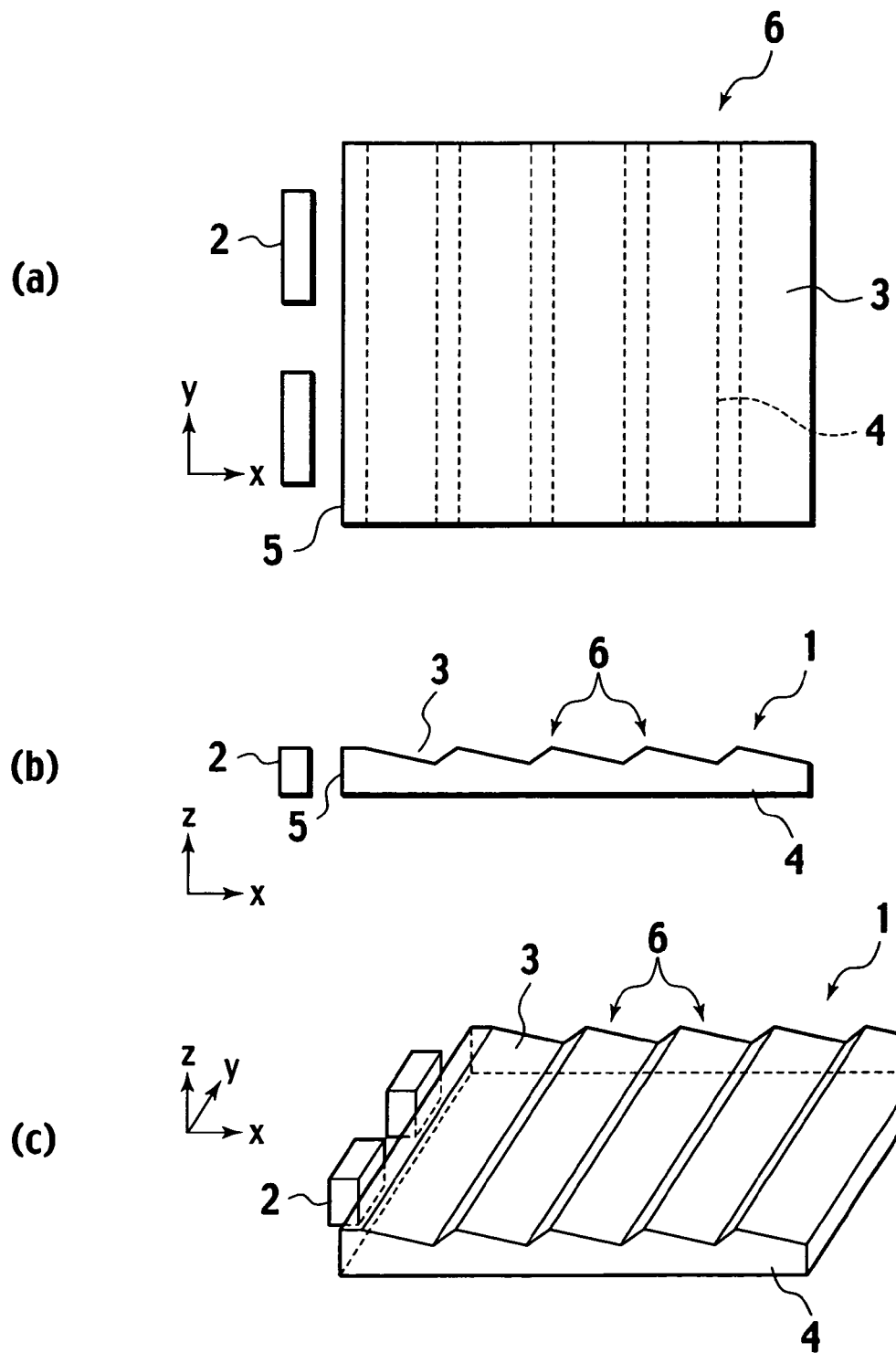
FIG. 5 shows the light guide plate of this embodiment.

FIG. 5 shows the light guide plate. FIG. 5 (a) is a plan view of the light guide plate, FIG. 5 (b) is a side view of the light guide plate and FIG. 5 (c) is a perspective view of the light guide plate. In these drawings, the light emitting diodes 2 light sources are shown.

The light guide plate 1 is comprised of a transparent material having a determined refractive index and has a substantially planar form having an upper face 3 and a lower face 4 that are both substantially rectangular shaped. Referring to the coordinate axis, the entry face 5 of the light guide plate 1 comprises the part into which light rays from the end face between the lower face 4 and the upper face 3 substantially parallel with the x y plane, are entered.

In order to alleviate darkness between the light emitting diodes 2 providing the light sources and a hotspot or bright line, the reflective elements 6 of the light guide plate 1 are disposed on the upper face 3 opposing the liquid crystal display elements 7 so as to avoid or alleviate reflected light from the reflective elements 6 being output in the direction of the liquid crystal display elements 7, a light ray 100 reflected by the reflective elements 6 being deflected in the direction of the reflector 10 and then emitted outside of the light guide plate 1. That is to say, the light guide plate 1 guides light rays to the reflector 10 face.

A light ray 100 incident to the light guide plate 1 from the light emitting diodes 2 in the xy plane is reflected and deflected in the—z axial direction by the reflective elements 6 integratedly formed on the upper face 3 on that side of the light guide plate 1 nearer the liquid crystal display elements 7, a part of this light passing the lower face 4 that opposes the upper face 3 before reaching the reflector 10 face.

The lower face 4 that opposes the upper face 3 of the light guide plate 1 may be a mirror face or a coarse face, but for this embodiment of the present invention, an anisotropic diffusion pattern layer 18 capable of diffusing light anisotropically is integratedly formed thereon. This anisotropic diffusion pattern layer 18 further improves darkness occurring between the light emitting diodes 2 light source and a hotspot or bright line.

The anisotropic diffusion pattern layer 18 is a hologram (anisotropic diffusion pattern) having anisotropic properties formed on the lower face 4. This hologram is called a surface relief hologram to distinguish it from a three dimensionally formed hologram. This anisotropic diffusion pattern layer 18 is large in the direction between the light emitting diodes 2 light sources (the y axial direction) and smaller in the direction between the entry face 5 and an anti-entry face 15 opposing this entry face 5 (the x axial direction), and diffuses light anisotropically. Further, the anisotropic diffusion pattern layer 18 is formed integratedly with the light guide plate 1 providing a concave/convex pattern formed from a surface relief hologram.

Light rays 100 reflected and deflected by the reflective elements 6 formed on the upper face 3 of the light guide plate 1 are reflected in the direction of the anisotropic diffusion pattern layer 18 formed as an integrated body with the lower face 4 that opposes the upper face 3, while a part of the light is passed through the lower face 4. At this time the light is diffused at the anisotropic diffusion pattern layer 18 before reaching the face of the reflector 10.

The light rays 100 reflected at the reflective elements 6 are substantially diffused at the hologram in the direction between the light emitting diodes 2 light sources in order to alleviate a deficiency of light rays arising between the light emitting diodes 2 light sources and are diffused into what is substantially an elliptical form from the anisotropic diffusion pattern layer 18, before being emitted toward the reflector 10.

In this way, the reflective elements 6 reflect light input from the entry face 5 and fulfill a role of deflecting light in the direction of the anisotropic diffusion pattern layer 18. The reflective elements 6 are formed continuously or discontinuously from one side face of the light guide plate 1 to the other side face, and the greater part of the reflective elements 6 are used for reflecting light. Accordingly, the upper face 3 on which are formed the reflective elements 6 as in this embodiment, has a high degree of efficiency in reflecting incident light in the direction of the anisotropic diffusion pattern layer 18, thereby realizing an improved degree of efficiency in the usage of light by this light guide plate 1.

The light guide plate 1 having the form as described above can be produced by extrusion molding in the appropriate mold of a material such as PMMA, polyolefine or polycarbonate.

Figure 6:
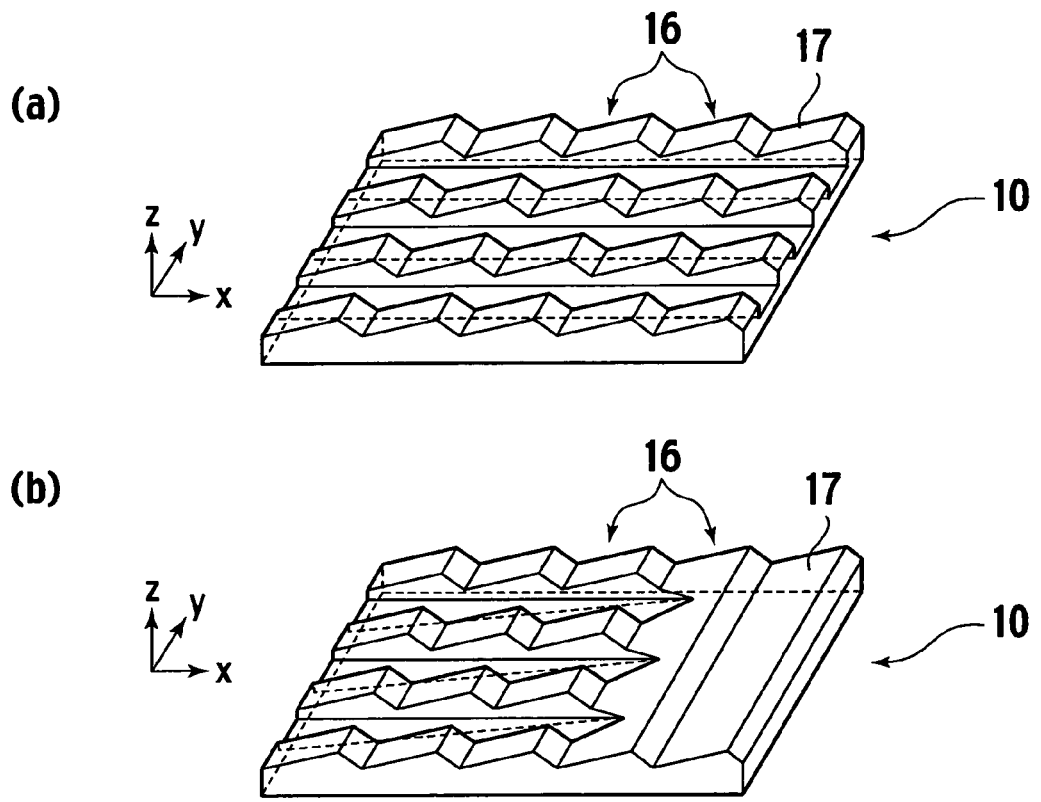
FIG. 6 shows the reflector of the light guide plate of this embodiment.

FIG. 6 shows the reflector. FIG. 6 (a) is a perspective view of an example of the reflector, FIG. 6 (b), a perspective view of another example of a reflector.

The reflector 10 has the function of reflecting light rays guided by the reflective elements 6 of the light guide plate 1. Reflective grooves 16 for guiding light rays in a determined direction in the upper face 3 side of the light guide plate 1 are formed on this reflector. Further, a metal deposition layer 17 of silver or the like, is formed on the face of the reflective grooves shaped reflector 10 to improve reflective efficiency.

Moreover, the reflective grooves 16 shape of the reflector 10 is a shape that enables efficient entry of light rays in a direction in which the optical sheet 8 positioned between the light guide plate 1 and the liquid crystal display elements 7 can improve frontal luminance. Light rays reaching the reflective grooves 16 formed on the face of the reflector 10 and the metal deposition layer 17 providing the surface layer can be deflected to a direction or an angle different to that of incident light due to the effect of mirror reflection.

The reflective grooves 16 formed on the reflector 10 need not necessarily have the same form in entirety. It is possible that the form of the reflective grooves 16 in the vicinity of the upper face 3 of the light guide plate 1 be different to the form of other parts of the reflective grooves 16, thereby enabling the reflective grooves 16 to provide different functions. For example, it is possible for the reflective grooves 16 to provide a form that chiefly facilitates diffusion of light in the vicinity of the upper face 3, while other parts of the reflective grooves 16 may function to efficiently return light rays output from the light guide plate 1 to the reflector 10 back inside the light guide plate 1, or, the reflective grooves 16 may function to reflect those light rays at an angle that enables the light rays to efficiently reach the reflective elements 6 integratedly formed on the light guide plate 1. Further, by forming the shape of the reflective grooves 16 appropriately, it is possible for light to be concentrated and output from the light guide plate 1 in the direction of the liquid crystal display elements 7.

The above described configuration enables this embodiment to provide a backlight device and liquid crystal display elements in which the problems of hotspots or bright line occurring in the region of the light entry face 3 of the light guide plate 1 or of darkness arising between the light emitting diodes 2 light sources that afflict conventional technology to be alleviated.

Figure 7:
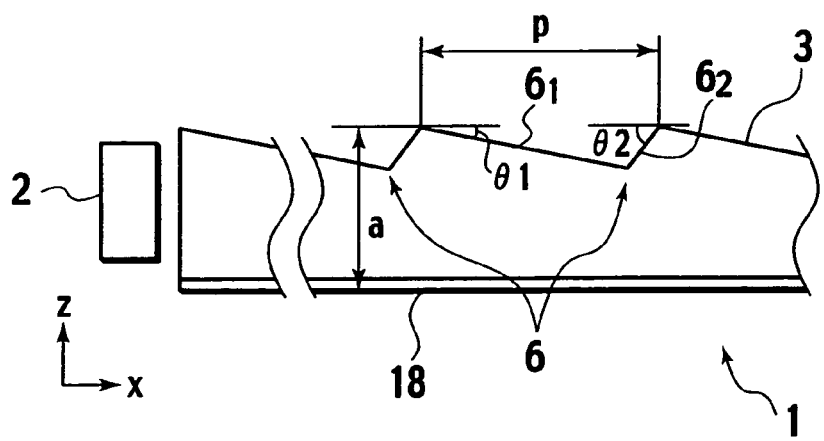
FIG. 7 shows the dimensions of each of the parts of the light guide plate.

FIG. 7 shows the dimensions of each part of the light guide plate.

The distance a between the upper face 3 and anisotropic diffusion pattern layer 18 is generally determined by the type (the characteristics) of the light emitting diodes 2 light sources, however, this distance should be within the range from 0.3-3.0 mm, preferably 0.5-1.0 mm and more preferably still 0.6-0.8 mm. The angle θ1 formed between the first face $6_1$ of the reflective elements 6 and the upper face 3 should be between 0.2-5°, preferably 0.3-3.0° and more preferably still 0.3-1.5°. The angle θ2 between the second face $6_2$ of the reflective elements 6 and the upper face 3 should be not greater than 90°, preferably 50-87° and more preferably still 75-80°. Here, viewed from inside the light guide plate 1, the first face $6_1$ is inclined toward the light emitting diodes 2 light sources side of the light guide plate 1, and the second face $6_2$ is inclined toward the side opposite that side closer to the light emitting diodes 2.

The interval p between neighboring reflective elements 6 should be uniform, and preferably within the range 50-500 μm, more preferably 50-250 μm and more preferably still 100-150 μm. Note that if the interval p is made uniform a moire phenomena arises due to interference from the cell arrangement of the liquid crystal display elements 7, therefore this interval can intentionally be made random.

Figure 8:
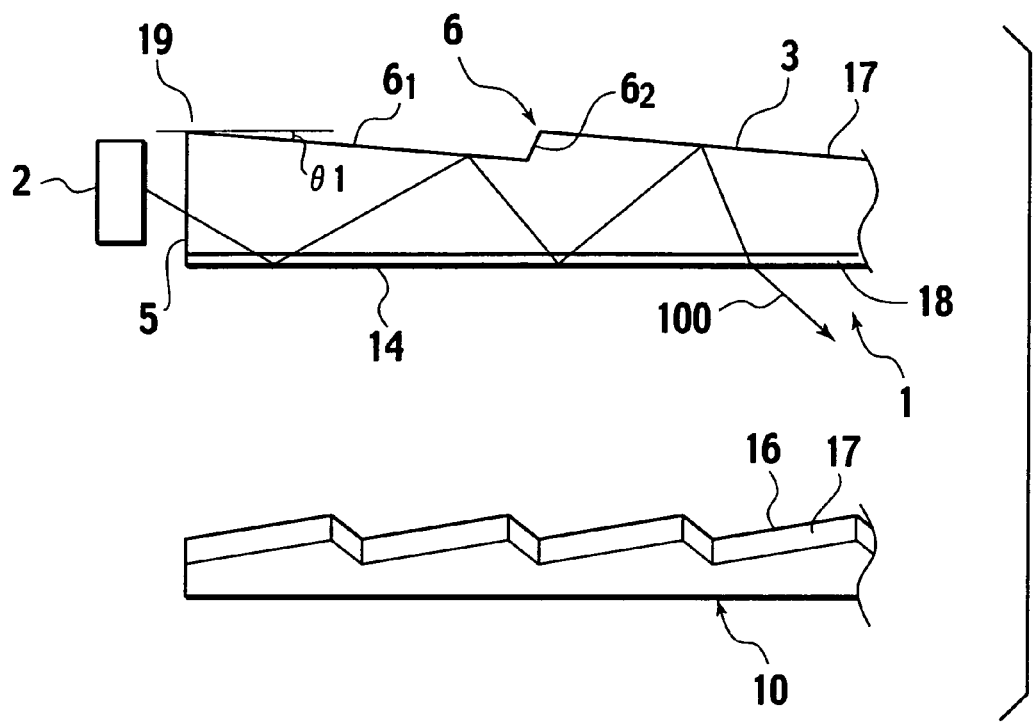
FIG. 8 shows the optical path in the light guide plate.

FIG. 8 shows the optical path within the light guide plate.

Light rays 100 incident to the entry face 5 of the light guide plate 1 from the light emitting diodes 2 undergo total reflection while traveling within the light guide plate 1, between the lower face 4 integratedly formed with the anisotropic diffusion pattern layer 18 and the upper face 3, until a critical angle formed with the anisotropic diffusion pattern layer 18 or the lower face 4 is reached.

The first face $6_1$ of the reflective elements 6 performs the role of deflecting light to be reflected in the direction of the anisotropic diffusion pattern layer 18. As the angle formed between the angle of incidence of light that enters the entry face 5 and the upper face 3 is small, the incident light is deflected in the direction of the anisotropic diffusion pattern layer 18 as it is reflected to the first face $6_1$ of the reflective elements 6, and when the angle of this traveling light and the anisotropic diffusion pattern layer 18 exceeds a critical angle, the light is output from the anisotropic diffusion pattern layer 18. A part of the light traveling within the light guide plate 1 is output from the reflective elements 6 as leaked light when the angle between the light and the first face $6_1$ of the reflective elements 6 reaches a critical angle.

Here, to the extent that the angle θ1 formed between the reflective elements $6_1$ of the reflective elements 6 and the anisotropic diffusion pattern layer 18 is small, the light is gradually pointed upward due to reflection at the reflective elements $6_1$ of the reflective elements 6, thus the direction of light output from the light guide plate 1 is collimated. The light thus arranged can be easily managed, but light extracted from the anisotropic diffusion pattern layer 18 is further deflected by the reflective grooves 16 formed on the face of the reflector 10 and the metal deposition layer 17 formed on the face of the reflective grooves 16, and the light rays are reflected in the direction of the light guide plate 1 again.

These light rays are further diffused at the anisotropic diffusion pattern layer 18 and are directed toward the upper face 3. At this time, as the traveling direction of the light rays is set to an angle below the angle for total reflection in relation to the faces of the anisotropic diffusion pattern layer 18 and the reflective elements 6, light reflected from the metal deposition layer 17 and the reflective grooves 16 of the reflector 10 is emitted from the upper face 3 of the light guide plate 1. Light rays emitted from the light guide plate 1 undergo a determined deflection at the optical sheet 8 before entering the lower face 9 of the liquid crystal display elements 7.

A concrete example of this embodiment of the present invention will now be described, provided that this example is illustrative and not restrictive in the application of the invention. In the light guide plate 1 of this embodiment the shape of the reflective elements 6 employs a V-shaped form as shown in FIG. 8.

The angle between the inclination of the reflective elements 6 and the upper face 3 (θ1) is 1.7°, the intervals between the reflective elements 6 being constant, disposed from the corner part 119 and the intersection of the entry face 5 at a pitch of 120 μm (p=120 μm).

As shown in FIG. 8 the mold for the light guide plate 1 is prepared having V shaped grooves such that the first face $6_1$ is directed to face the light emitting diodes 2 so that the angle of inclination brings light from the entry face 5, gradually to an angle below that angle for total reflection and the light guide plate is produced by extrusion processes using the mold. Further, for this embodiment, the anisotropic diffusion pattern layer 18 that diffuses light anisotropically and is provided by a surface relief hologram integratedly formed with the lower face 4 facing the upper face 3.

Figure 9:
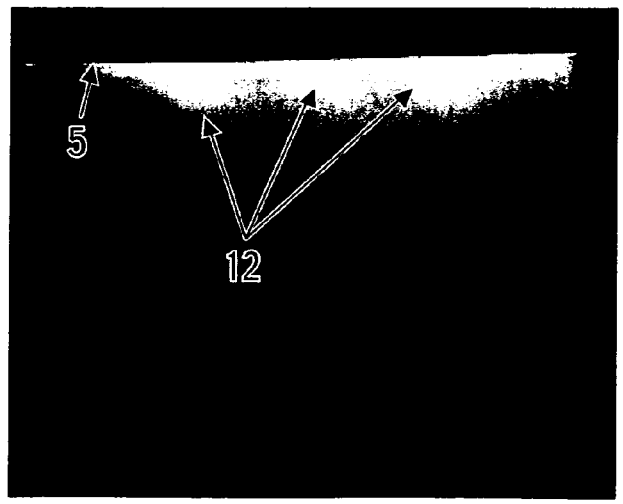
FIG. 9 is a plan view, for the purpose of providing a comparative example, showing the distribution of light emitted from a backlight device that does not employ an anisotropic diffusion pattern surface relief hologram.

FIG. 9 is a plan view, for the purpose of providing a comparative example, showing the distribution of light emitted from a backlight device that does not employ an anisotropic diffusion pattern layer 18 face relief hologram. In this example a light ray that enters from the entry face 5 of the light guide plate 1 passes the lower face 4 that is made a mirror face instead of the anisotropic diffusion pattern layer 18 and is reflected by the light guide plate 1, passes the light guide plate 1 and in the condition in which it is emitted, bright line 12 as shown in FIG. 9 occurs. For this reason, it is preferable for a pattern that can diffuse light to be formed on the lower face 4 facing the reflective elements 6. Further it is preferable in order to improve frontal luminance that diffusion is substantial in the direction between the light emitting diodes light sources and is smaller in the direction between the reflective entry face 15 and the light emitting diodes light source.

For the embodiment according to the present invention, the hologram formed by the anisotropic diffusion pattern layer 18 diffuses substantially in the direction between the light emitting diodes light sources while the diffusion of light is smaller in the direction between the reflective entry face 15 and the light emitting diodes 2 light sources. Further, each of the half value diffusion angles use a pattern having 60° in the direction between the light sources and 1° in the other direction.

Figure 10:
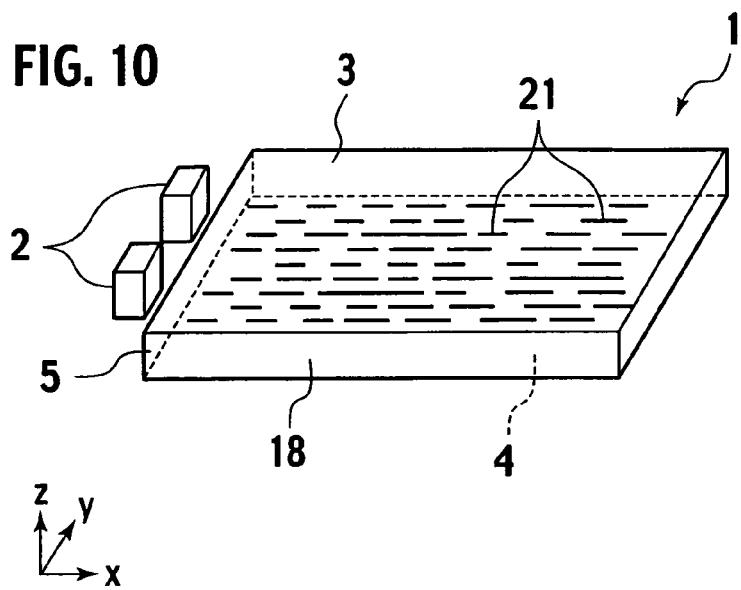
FIG. 10 shows a hologram formed as an anisotropic diffusion pattern that forms an integrated layer.
Figure 11:
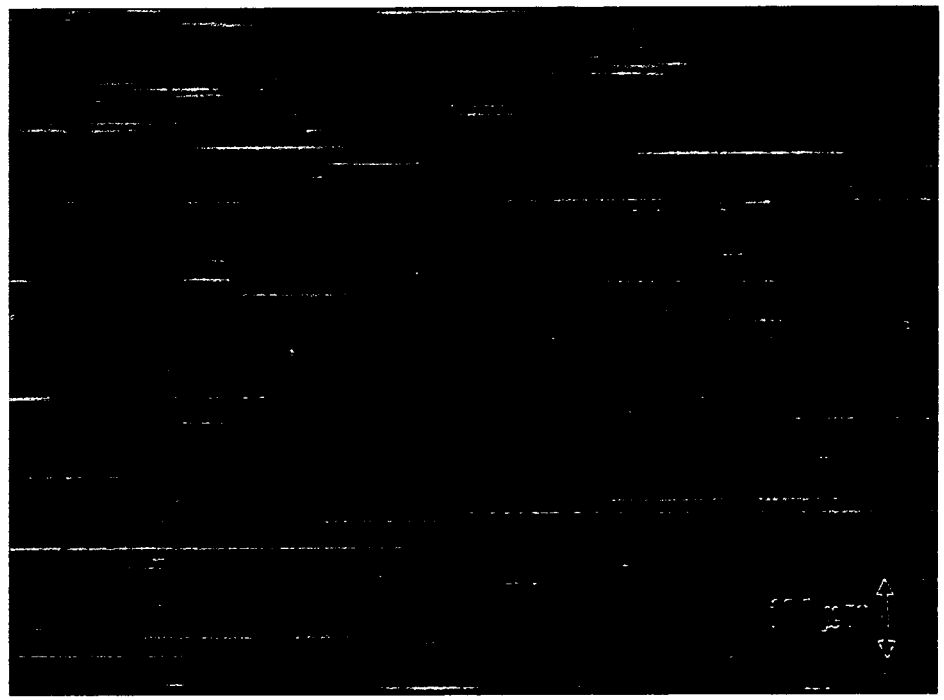
FIG. 11 shows the hologram enlarged 200 times.

FIG. 10 shows a hologram formed as an anisotropic diffusion pattern that forms an integrated layer. FIG. 11 shows the hologram enlarged 200 times.

As shown in FIG. 10, a plurality of speckles 21 of a substantially elliptical shape are formed with the longitudinal axis thereof being the direction between the light emitting diodes 2 light sources and the reflective entry face 15, that is to say, the x axial direction in FIG. 10, such that diffusion is smaller in the direction between the anti entry face 15 and the light sources (the x axial direction) while diffusion is substantial in the direction between the light emitting diodes 2 light sources (the y axial direction).

Of light rays 100 that undergo total reflection and are deflected at the V-shaped reflective elements 6 integratedly formed on the upper face 3, a portion thereof that reach the anisotropic diffusion pattern layer 18 are reflected to the reflector 10 side of the light guide plate 1. When a light ray 100 that has undergone total reflection and deflection at the V-shaped reflective elements 6 reaches the anisotropic diffusion pattern layer 18, the angle of total reflection is lost as the anisotropic diffusion pattern layer 18 has a coarse face (see FIG. 11), so a part of the light rays pass toward the reflector 10 side of the light guide plate 1. When the light rays 100 thus passing toward the reflector 10 side are emitted from the light guide plate 1, these light rays are anisotropically diffused due to the diffusion effect of the hologram and the light is diffused substantially in the direction between the light emitting diodes 2 light sources, reaching the reflector 10.

Figure 12:
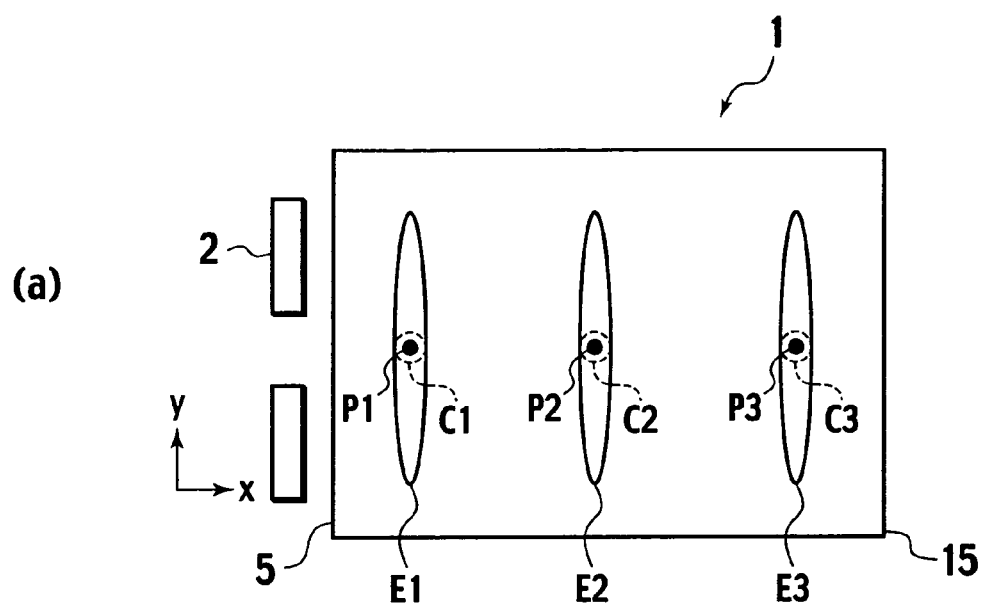
FIG. 12 is an explanatory drawing illustrating the properties of the master hologram.
Figure 12:
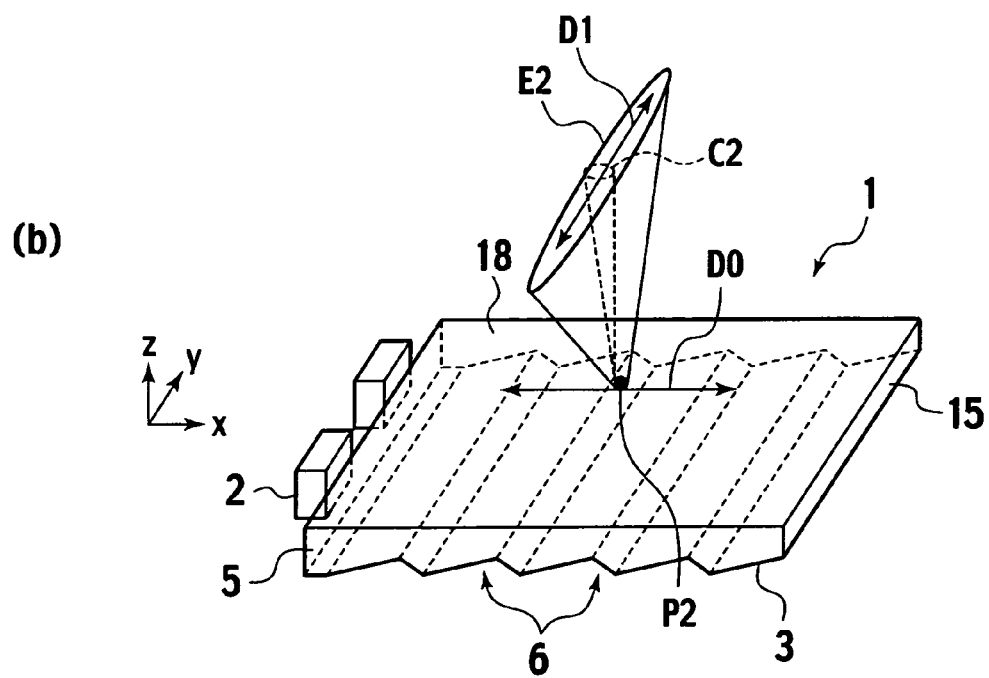

FIG. 12 is an explanatory drawing illustrating the properties of the master hologram.

FIG. 12 (*a*) is a plan view showing angle dependence of the luminance of light emitted from the points P1, P2, P3 of the anisotropic diffusion pattern layer 18. FIG. 12 (*b*) is a perspective view showing in solid form, the strength distribution of light emitted from the point P2 of the anisotropic diffusion pattern layer 18 of the light guide plate 1.

Due to the effect of the hologram formed on the anisotropic diffusion pattern layer 18, light emitted from the points P1, P2 and P3 of the anisotropic diffusion pattern layer 18 of the light guide plate 1 diffuses substantially in the direction between the light emitting diodes light sources as shown by the ellipses E1, E2 and E3, while the light diffuses less in the direction between the reflective entry face 15 and the light emitting diodes 2. The ratio of the longitudinal axial direction and the shorter axial direction of the ellipses E1, E2 and E3 that shows the strength distribution of the diffused light is changeable, but in the case of this embodiment this ratio is 1:60.

Figure 13:
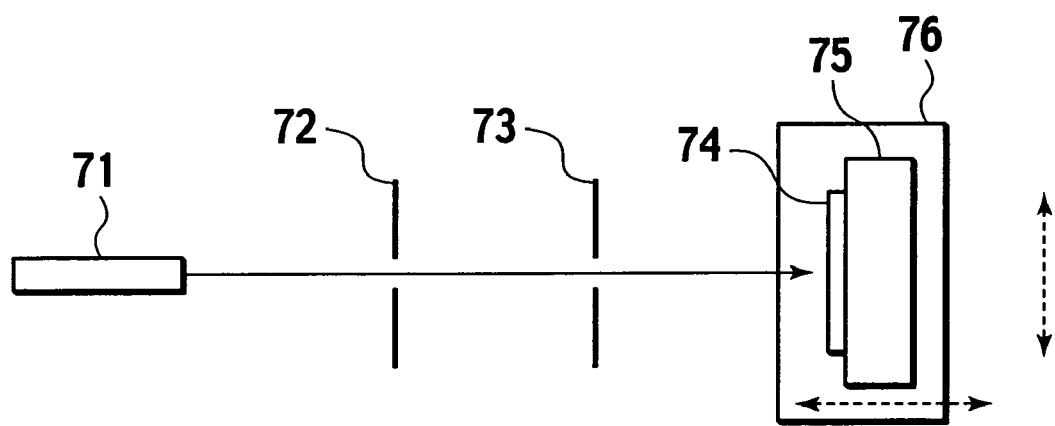
FIG. 13 is a block diagram showing the configuration of the device used for forming the master hologram.

FIG. 13 is a block diagram showing the configuration of the device used for forming the master hologram.

The hologram formed by the anisotropic diffusion pattern layer 18, is a copy of a master hologram and has the same optical properties as the master hologram.

The device shown in FIG. 13 has a laser light source 71 for emitting laser light of a determined wavelength, a mask 72 having an opening of for example a rectangular shape, a mask 73 for passing light only of desired regions, a photoresist 74 and a table 75 that supports the photoresist 74 such that the photoresist 74 is movable in the planar direction.

The laser light source 71 can switch between the red, green and blue (RGB) elements of the laser light and emit the light. This is because in order to produce a hologram that diffuses the white light required for illuminating the liquid crystal display device of for example a mobile telephone device, it is necessary to expose each of the RGB elements of the laser light to the photoresist 74. Three laser light sources emit respectively one of the RGB elements, and a switch occurs between these different light sources as the device is used.

The mask 72 has an opening provided by a rectangular shaped diffuser. Frost glass for example can be used for this diffuser. The dimensions of the respective long and short sides of the rectangular shape correspond respectively to the dimensions of the short and long axes of the substantially elliptical speckles formed on the photoresist 74. Note that the relationship between the long and short sides and the short and long axes is a mutual relationship of Fourier transformation.

The mask 73 is used such that light is exposed only to the required regions of the photoresist 74. The hologram according to this embodiment does not expose light at once to all of the photoresist 74, but rather the appropriate parts are exposed so that each part obtains the desired diffusion characteristics. Multiple light exposures are performed repeatedly to each part until the photoresist 74 has been exposed entirely. This multiple light exposure is performed for each of the respective RGB elements. Once the hologram thus exposed to light is developed the master hologram is obtained.

The photoresist 74 is a thick film uniformly distributed with a highly photosensitive body such that extremely weak light can be detected and the speckles faithfully reproduced.

The supporting base 75 is used to move the photoresist 74 in the planar direction. The table 75 changes the position of light exposure to the photoresist 74 and adjusts the distance between the masks 72 and 73, and the photoresist 74 when moving the photoresist 74.

Figure 14:
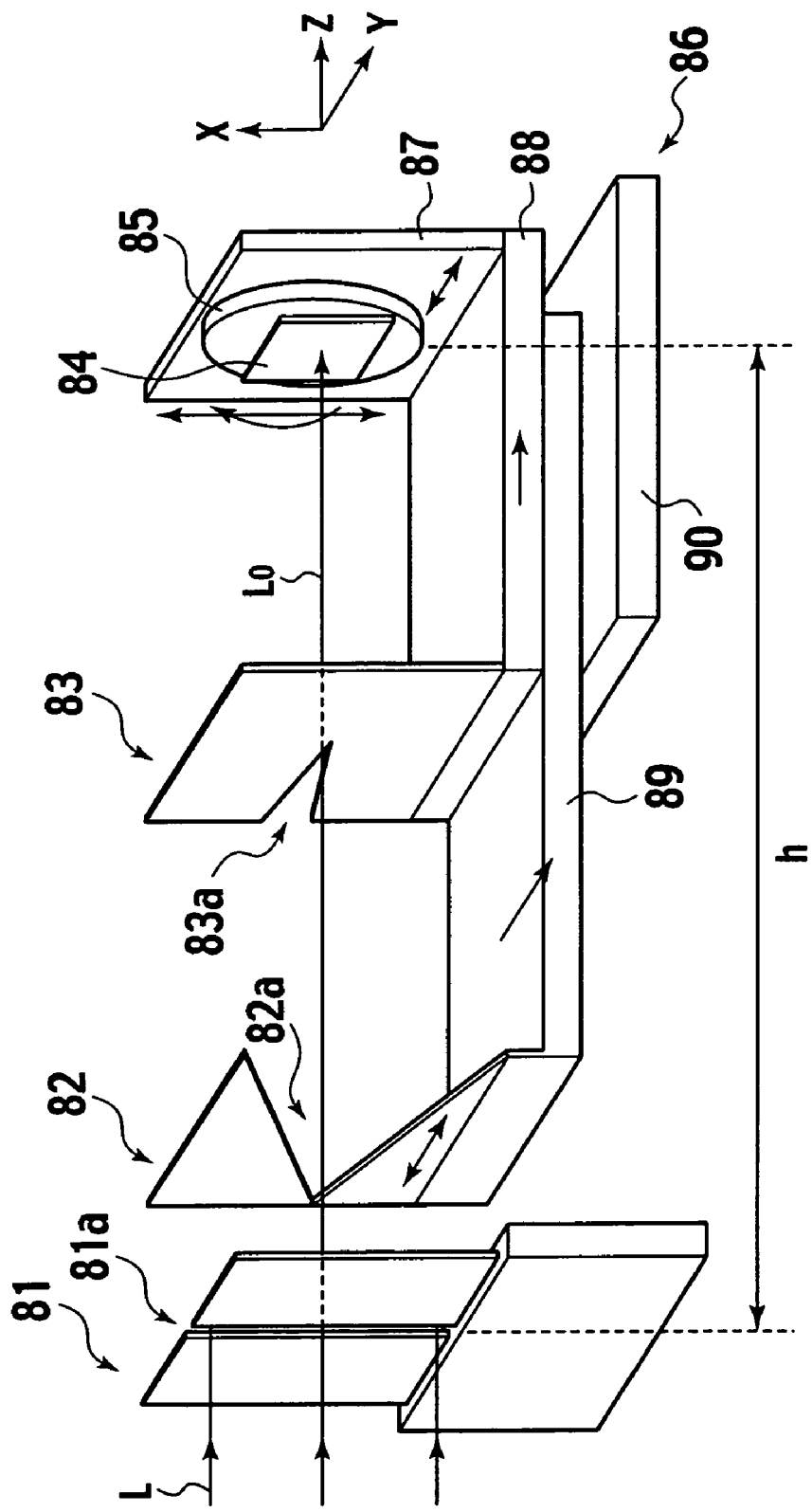
FIG. 14 is a perspective view showing the configuration of a device used for forming the master hologram.

FIG. 14 is a perspective view showing the configuration of a device used for forming the master hologram.

The masks 81 and 82 are equivalent to the mask 72 having the rectangular shaped opening shown in FIG. 13. The mask 81 has a slit 81*a*. The short side of the rectangular shaped opening is determined by the width of this slit. The mask 82 has a triangular shaped opening 82*a*. The long side of the rectangular shaped opening is determined by the maximum length in the longitudinal direction of the region of the 82*a* of the triangular shaped opening 82 which passes light passing the slit 81*a* of the mask 81. The masks 81 and 82 diffuse light passed by a diffuser not shown in the drawing.

The mask 83 equates to the mask 73 shown in FIG. 13. This mask 83 has a rectangular shaped opening 83*a*. The regions of the photoresist 84 that are exposed to light are limited to those parts to which light passing this rectangular shaped opening 83*a* reach. The entire face of the photoresist 84 can be exposed to light by changing these parts of the photoresist 84 and performing multiple exposures.

A master hologram is obtained when a photoresist is exposed to light using the devices shown in FIG. 13 and FIG. 14 and developed. A master hologram produced in this way is unevenly transferred to parts corresponding to the lower face 4 of the light guide plate 1 in a mold used for producing the light guide plate 1. This mold to which the master hologram has been transferred is then used to produce the light guide plate 1 by injection molding and the hologram can be integratedly formed as the anisotropic diffusion pattern layer 18 on the lower face 4 of the light guide plate 1.

Figure 15:
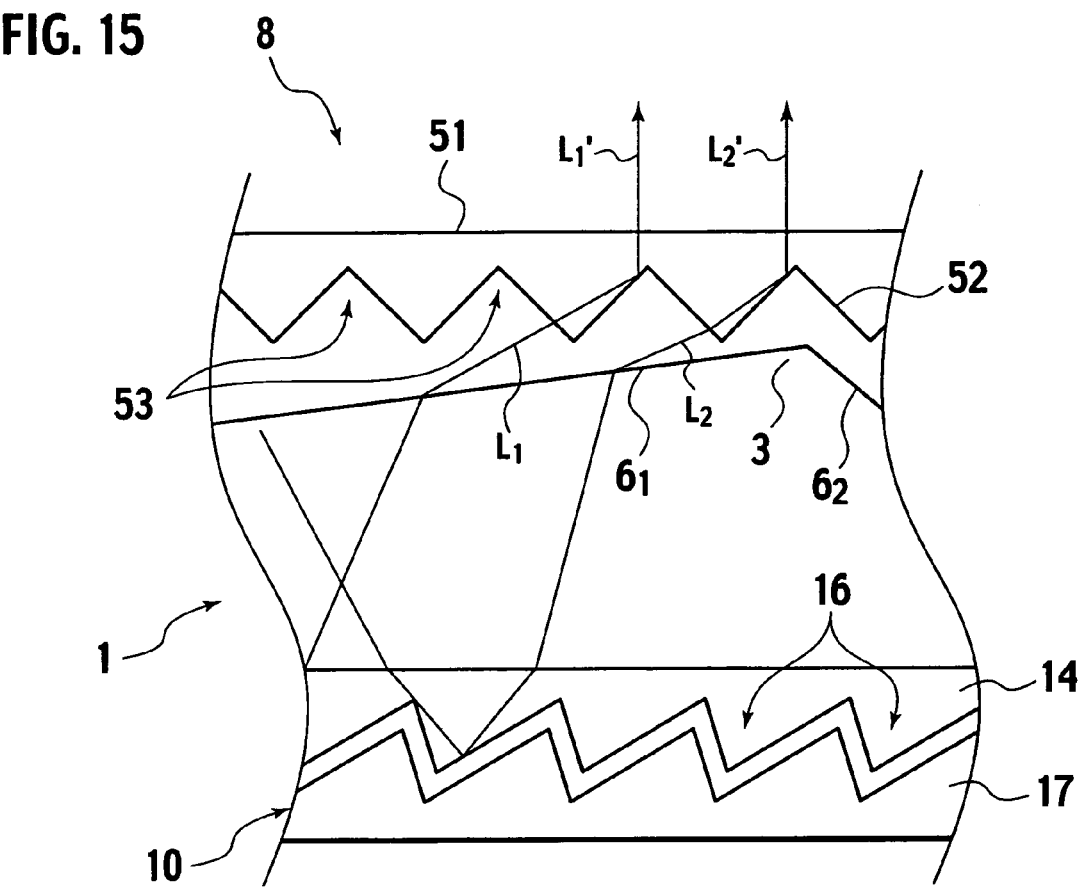
FIG. 15 shows a part of the backlight device formed by the light guide plate and optical sheet.

FIG. 15 shows a part of the backlight device formed by the light guide plate and optical sheet.

In this backlight device comprising the light guide plate 1 and the optical sheet 8 light emitted from the upper face 3 of the light guide plate 1 includes lights $L_1$ and $L_2$, being light elements which form a small angle with the upper face 3. The optical sheet 8 has a flat upper face 51 and a prism shaped lower face 52. When the lights $L_1$ and $L_2$ that form a small angle with the upper face 3 of the light guide plate 1 enter from this lower face 52, the angle is changed so as to become a substantial angle with the upper face 51 of the optical sheet 8 and the lights are emitted ($L_1'$ and $L_2'$). In this way the optical sheet 8 improves the frontal strength of light output to the liquid crystal display elements 7.

Figure 16:
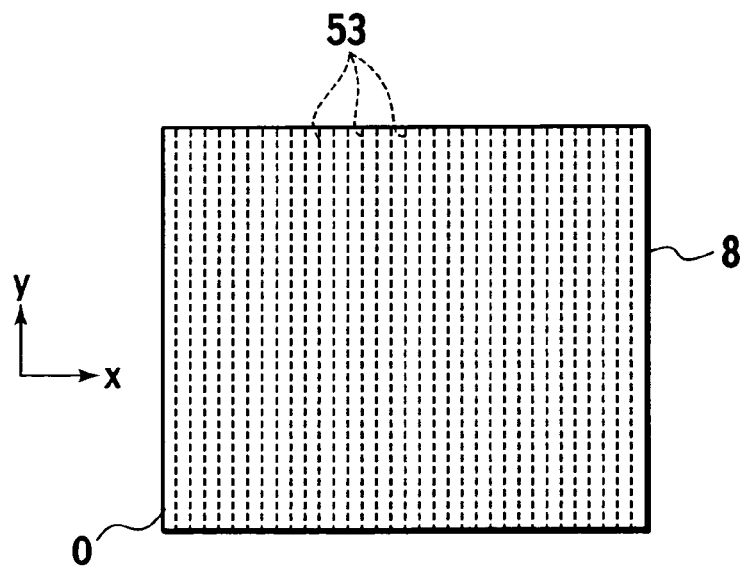
FIG. 16 shows the optical sheet.

FIG. 16 shows the optical sheet.

This optical sheet is made of a transparent material such as for example PMMA, polyolefine, polycarbonate or a photo-resistant resin. Reflective grooves 53 that form a continuous prism shaped construction are disposed on the lower face 52 opposing the upper face 51. This optical sheet 8 is disposed above the upper face 3 of the light guide plate 1.

Although the invention has been described herein by reference to the exemplary embodiment, the invention is not limited thereby, and modifications and variations of the embodiment as described will occur to those skilled in the art, in light of the above teachings. Further, the particular values provided in the above description are intended to provide examples that are illustrative with respect to the invention and not restrictive.

In the above described light guide plate, it is preferable, when the luminance representing the luminance from an exit face of the backlight device that reaches the maximum at angle θ max is A, that the luminance B of light emitted from the light guide plate lower face fulfills the relational expression B≧0.25A. That is to say, it is preferable that the quantity of what is termed "leaked light" as it occurs in the usage of a backlight device or light guide plate of the prior art be not more than 25% of the total emitted light.

The method used for measuring the degrees of luminance A and B of the light will now be described.

Figure 17:
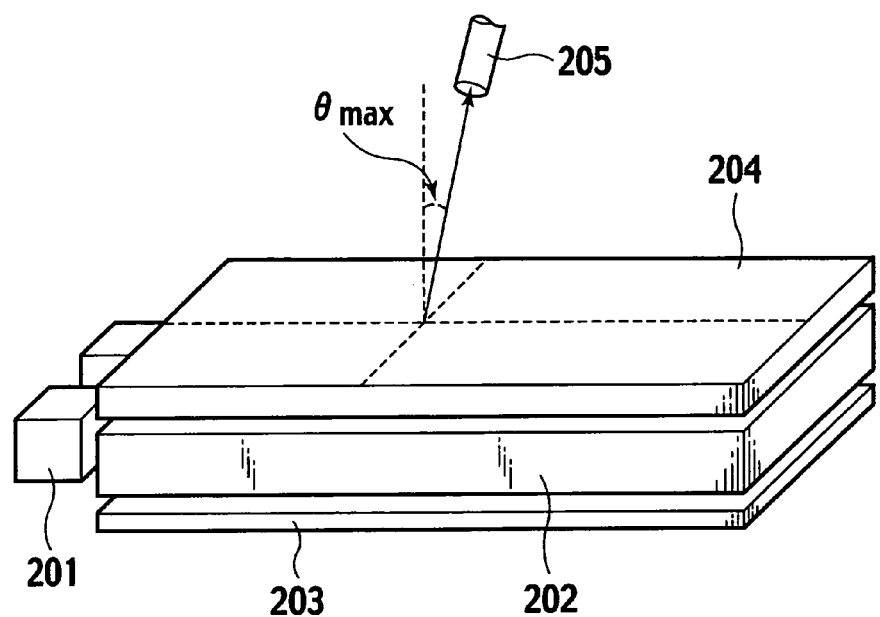
FIG. 17 provides a schema of the measuring device used for measuring the total quantity of light emitted from the light guide plate.
Figure 17:
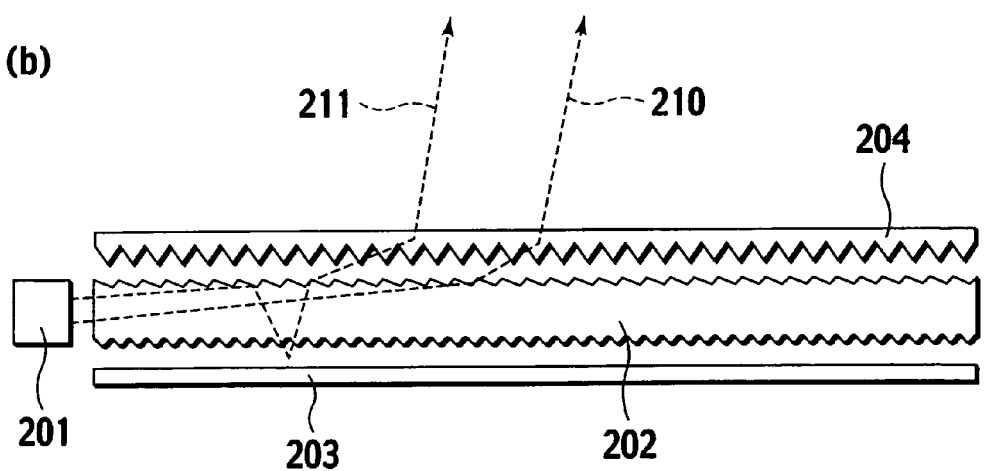

(I) Firstly, as shown in FIG. 17 (a), a light emitting diode 201, light guide plate 202, reflector 203 and optical sheet 204 are used and a backlight device is assembled. Next, a luminance meter 205 is disposed over the central part of the exit face of the optical sheet.

(II) With the luminance meter taking as its rotational center, the center part of the exit face of the optical sheet, the luminance is measured while changing the angle within the plane orthogonal to both the entry face of the light guide plate and the exit face, in order that the luminance obtains the maximum at angle θ max.

(III) The luminance at each point of the exit face of the optical film is measured with the angle determined as above. This luminance is A (n). n shows 5-10 optionally selected measurement locations, while the luminance A is the average value of each A (n). The luminance A measured in this way is shown in FIG. 17 (b), which illustrates the luminance of the sum of the directly emitted light 210 and the light 211 that passes via the reflector.

Figure 18:
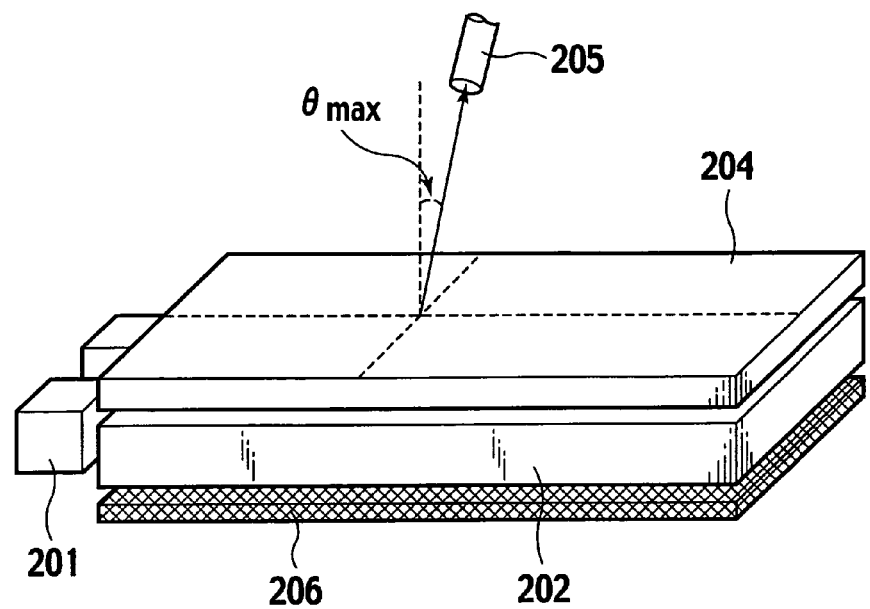
FIG. 18 provides a schema of the measuring device used for measuring the quantity of light, within the light emitted from the light guide plate, minus the light emitted in the direction of the reflector.
Figure 18:
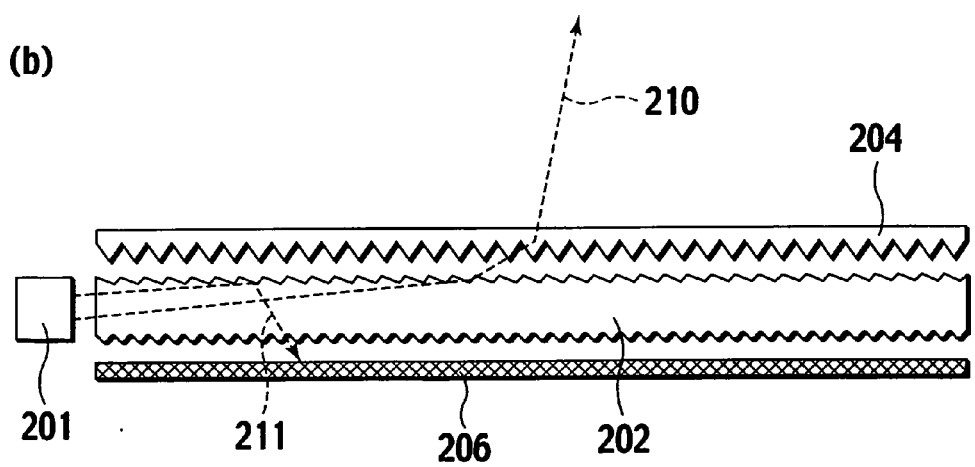

(IV) Next, as shown in FIG. 18 (a), the reflector is replaced with a photo absorbent material 206 like a black sheet having low reflectivity, and at the angle θ max described just previously, the luminance C (n) is measured at points of n locations in the same way to obtain the average value being luminance C. As shown in FIG. 18 (b), this luminance C can be thought of as not including light once it has passed a reflector and is only light 210 that is directly emitted from within the light guide plate.

(V) The luminance B of light 211 emitted in the direction of a reflector can now be obtained from the above described degrees of luminance A and C; that is to say B=A−C.

The values for the degrees of luminance A and B can be determined in this way, moreover, the same kind of light emitting diode and optical sheet as are described in the description of the embodiment can be used in the application of this measurement method. Further, the reflector is normally obtained by using a reflector having high reflectivity used in a backlight device, as if there is insufficient reflectivity it is not possible to obtain precise values. In the case of the present embodiment, Luire Mirror 75W05 by Reiko Co. Ltd. was used. The reflectivity of Luire Mirror 75W05 was measured at 95.5% under conditions of 2 degree view angle, C light source and using a Minolta spectrometer CM-2500d. The reflectivity shown here is the Y value for the XYZ color system (also called the CIE1931 color system). Further, it is preferable to use a sheet used for the purpose of reducing reflectivity as the light absorbing member, and for this embodiment photographic masking tape, number P-743 by Permacel was used. The reflectivity of P-743 is 3.5% measured under the same conditions as were used to measure the Luire Mirror 75W05. This sheet has a thickness of 12.7 mm, and using PET film as the mounting paper a plurality of these sheets are arranged adhered in lines on the mounting paper, cut to the appropriate size for each mounting paper.

In this embodiment, it is preferable that the luminance B obtained as described be not less than 25% of the luminance A, and more preferably still not less than 30%. If it is less than 25%, bright line does not disappear and a trend toward a deterioration in appearance occurs in the area of light input. Further, to the extent that the proportion of light that is of the luminance B increases, this trend toward deterioration in appearance diminishes, and in principle there is no limit to this deterioration, (it can be 100%), however, completely eradicating light that enters the light guide plate and exits directly from the exit face is difficult, and practically speaking it can be inferred that an upper limit is 60%-70%

EXAMPLE 1

Next, an example is provided of measuring the proportion of light emitted from a backlight device where the light is directly emitted from the light guide plate and that is emitted after being reflected at a reflector.

For the light guide plate 1 used for this embodiment, polycarbonate was employed, the entry face 5 having a length of 40 mm in the planar direction, 50 mm in the perpendicular direction and of 0.7 mm thickness. The reflective elements 6 formed on the upper face 3 of this light guide plate 1 have the values, for those shown in FIG. 7, θ1=1.5°, θ2=35° and p=150 μm. An anisotropic diffulsion pattern layer 18 was formed on the lower face 4 of the light guide plate 1 providing a hologram pattern of 60°×1°. Here, 60°×1° means that light entering the hologram face vertically is diffused anisotropically 60°×1° in relation to the direction of entry.

With this embodiment a Topcon BM-5 luminance meter was used with the angle of measurement being θ max as above, at 0.2° in relation to the normal of the exit face of the light guide plate. Four NSCW335's by Nichia were used for the light sources. A Luire Mirror 75W05 by Reiko provided the reflector. A prism sheet having an apex angle of 63 degrees was used for the optical sheet, the prism being arranged so as to be downward facing. Further, an arrangement forming an absorbent body that is made of P-743 photographic masking tape by Permacel is disposed in the position of the reflector, to absorb light at the reflector side of the light guide plate.

Figure 19:
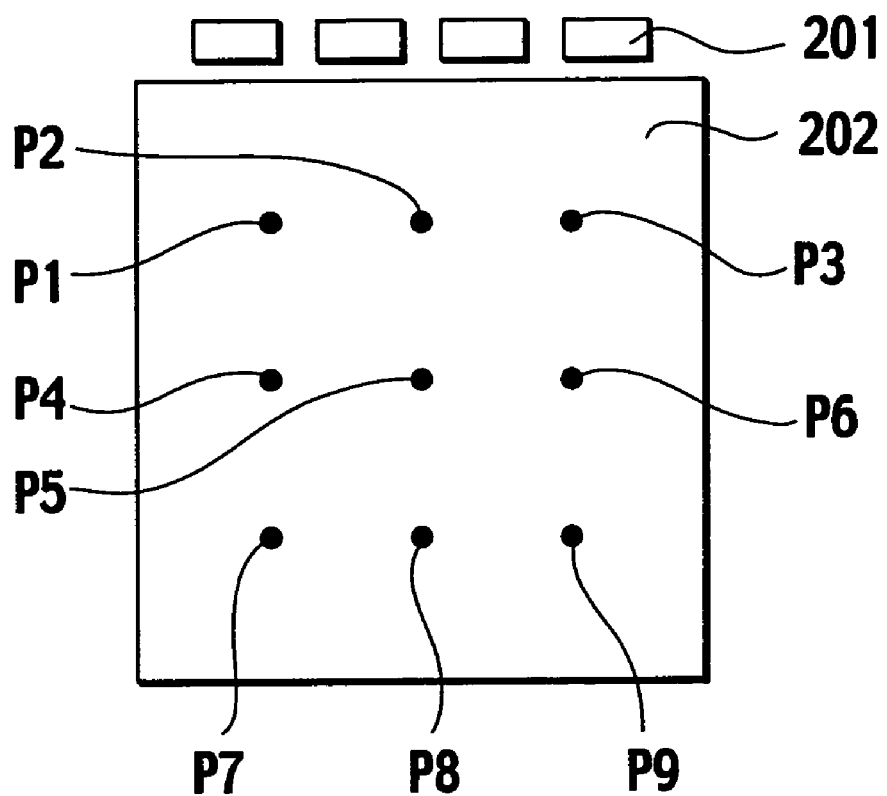
FIG. 19 is a plan view of the light guide plate showing the position of the performance of the measurement of frontal luminance of the light guide plate.

FIG. 19 is a plan view of the light guide plate showing the position of the performance of the measurement of frontal luminance of the light guide plate. As shown in FIG. 19, for this embodiment the measurements were performed at the nine locations indicated by points P1-P9, at substantially equidistant intervals on the exit face of the light guide plate 202.

Table 1 shows the results of measurements of frontal luminance ($cd/m^2$).

TABLE 1 measurement results of frontal luminance ($cd/m^2$)

| | \multicolumn{10}{c}{Position} | | | | | | | | | |
|---|---|---|---|---|---|---|---|---|---|---|
| | P1 | P2 | P3 | P4 | P5 | P6 | P7 | P8 | P9 | Average |
| Reflector | 3240 | 3520 | 3400 | 2930 | 3350 | 3000 | 2050 | 2250 | 2040 | 2864 |
| Absorbent | 2230 | 2260 | 2080 | 1740 | 2040 | 1820 | 1194 | 1271 | 1088 | 1747 |
| Difference | 1010 | 1260 | 1320 | 1190 | 1310 | 1180 | 856 | 979 | 952 | 1117 |

In Table 1, line 2 shows frontal luminance when a Luire Mirror 75W05 is used for a reflector. Line 3 shows frontal luminance when an absorbent black body formed of P-743 is disposed in the position of the reflector. Line 4 shows the value obtained after frontal luminance occurring when using the black absorbent body is deducted from frontal luminance occurring when the reflector is used.

As can be seen from the values in the average column in Table 1, A as above=2864 ($cd/m^2$), B=1747 ($cd/m^2$), and C=1117 ($cd/m^2$), the above relationship of B≧0.25 A being fulfilled.

Table 2 shows the ratio for light directly emitted from the light guide plate without passing via a reflector and the ratio of light emitted when passing via a reflector, extracted from the measurement results shown in Table 1.

TABLE 2 ratio for light calculated from measurement results

| | \multicolumn{10}{c}{Position} | | | | | | | | | |
|---|---|---|---|---|---|---|---|---|---|---|
| | P1 | P2 | P3 | P4 | P5 | P6 | P7 | P8 | P9 | Average |
| Directly Emitted | 0.69 | 0.64 | 0.61 | 0.59 | 0.61 | 0.61 | 0.58 | 0.56 | 0.53 | 0.60 |
| Via Reflector | 0.31 | 0.36 | 0.39 | 0.41 | 0.39 | 0.39 | 0.42 | 0.44 | 0.47 | 0.40 |

The ratio for light emitted directly as shown in line 2, is obtained by dividing the value for frontal luminance when the black absorbent body is provided as shown in line 3 of Table 1 by the value for frontal luminance when the reflector is used as shown in line 2 of Table 1. The ratio for light emitted via the reflector shown in line 3 is obtained by dividing the value for frontal luminance difference in line 3 of Table 1 by the value for frontal luminance when the reflector is used shown in line 2 of Table 1.

The ratio of light passing via the reflector as shown in line 3 is a minimum value of 0.31 at the position of point P1 and a maximum value of 0.47 at the position of point P 9.

EXAMPLE 2

An example of the backlight device will now be described.

Referring to FIG. 4, the backlight device according to this example uses four NSCW335 light emitting diodes made by Nichia as the light sources 2 and the same light guide plate as used for example 1 for the light guide plate 1.

M165 by Mitsubishi Rayon, a prism film, is used to provide optical film 8, the prism face being disposed directed toward the side of the light guide plate 1. The reflector 10 is provided by a right angled triangle prism film having an apex angle of 90° and cross-section of pitch 50 µm, with a silver deposition of 1000 Å, disposed such that the crest line direction is orthogonal to the entry face 5.

For the backlight device of this embodiment light exiting that has passed via the reflector 1, was measured at the upper face of the optical film 8. The results indicated that in the vicinity of the entry face 5, 30% of the light had passed via the reflector. In the vicinity of the entry face 5, bright line and unevenness were not observed and there was a satisfactory appearance.

COMPARATIVE EXAMPLE 1

For the backlight device of the example 2, the respective upper and lower sides of the light guide plate 1 were reversed, and the light guide plate 1 was disposed such that the lower face 4 on which is formed the anisotropic diffusion pattern layer 18 opposes the optical sheet 8, and the upper face 3 on which is formed the reflective elements 6 opposes the reflector 10. Apart from this aspect of the light guide plate 1, the other elements of the configuration where the same as those of the backlight device of example 2 described above.

Light exiting from the backlight device of this comparative example 1 was measured at the upper face of the optical film 8. The results show that some bright line occurred in the vicinity of the entry face 5.

COMPARATIVE EXAMPLE 2

For the backlight device of example 2 a mirror face shape having no prism form was used for the reflector 1. The other elements of the configuration are the same as those of the backlight device of the embodiment 2.

Light exiting this backlight device of this comparative example 2 was measured at the upper face of the optical film 8. The results show that bright line clearly occurred in the vicinity of the entry face 5.

What is claimed is:

1. A backlight device comprising at least a light source, a light guide plate and a reflector wherein
    the light guide plate further provides an entry face into which light from the light source is incident, a lower face substantially perpendicular to the entry face and that opposes the reflector, and an upper face that opposes the lower face, and
    reflective elements that are capable of reflecting such that light is emitted from the lower face toward the reflector are disposed on the upper face of the light guide plate.

2. A backlight device comprising at least a light guide plate and a reflector wherein
    the light guide plate further provides an entry face into which light from a light source is incident, a lower face substantially perpendicular to the entry face and that opposes the reflector, and an upper face that opposes the lower face, and
    when the luminance representing the luminance of light from an exit face of the backlight device that reaches the maximum at angle $\theta$ max is A, the luminance B of light emitted from the light guide plate lower face fulfills the relational expression $B \geqq 0.25A$, wherein the angle $\theta$ is the output angle of light emitted from the upper face formed between the output light ray and the normal of the upper face.

3. The backlight device according to claim 2 wherein reflective elements that are capable of reflecting such that light is emitted from the lower face toward the reflector are disposed on the upper face of the light guide plate.

4. The backlight device according to claim 1 wherein the reflective elements are formed as an integrated body with the light guide plate.

5. The backlight device according to claim 1 wherein the reflector has reflective grooves disposed on the surface thereof that reflect light emitted from the lower face of the light guide plate to the light guide plate side.

6. The backlight device according to claim 1 wherein the reflector has a metallic film disposed on the surface thereof.

7. The backlight device according to claim 1 wherein the light guide plate is comprised of polymethyl methacrylate, a polyolefin resin, polycarbonate or a compound of these.

8. The backlight device according to claim 1 wherein the distance between the upper face and the lower face of the light guide plate is 0.3-3.0 mm.

9. The backlight device according to claim 1 wherein the reflective elements are formed by disposing a plurality of V-shaped grooves on the upper face of the light guide plate substantially parallel to the entry face.

10. The backlight device according to claim 9 wherein the reflective elements comprise:

a first face that is inclined toward the side of the light guide plate closest to the light source viewed from inside the light guide plate and
    a second face that is inclined toward the face opposite the light source viewed from inside the light guide plate, and
    an angle $\theta 1$ formed between the first face and the upper face is 0.2-5° and an angle $\theta 2$ formed between the second face and the upper face is not more than 90°.

11. The backlight device according to claim 1 wherein an anisotropic diffusion pattern is formed as an integrated body with the lower face of the light guide plate.

12. The backlight device according to claim 11 wherein the anisotropic diffusion pattern is a surface relief hologram.

13. The backlight device according to claim 1 wherein an optical sheet that deflects light emitted from the light guide plate so as to approach traveling direction of light to the direction normal to the upper face of the light guide plate is disposed in a position opposing the upper face of the light guide plate.

14. A light guide plate used in a backlight device comprising at least a light source, a light guide plate and a reflector wherein
    the light guide plate further provides an entry face into which light from the light source is incident, a lower face substantially perpendicular to the entry face and that opposes the reflector, and an upper face that opposes the lower face, and
    when the luminance representing the luminance of light from an exit face of the backlight device that reaches the maximum at angle $\theta$ max is A, the luminance B of light emitted from the light guide plate lower face fulfills the relational expression $B \geqq 0.25A$, wherein the angle $\theta$ is the output angle of light emitted from the upper face formed between the output light ray and the normal of the upper face.

15. The light guide plate according to claim 14 wherein reflective elements that are capable of reflecting such that light is emitted from the lower face toward the reflector are disposed on the upper face.

16. The light guide plate according to claim 14 wherein the reflective elements are formed as an integrated body with the light guide plate.

17. The light guide plate according to 14 wherein the light guide plate is comprised of polymethyl methacrylate, a polyolefin resin, polycarbonate or a compound of these.

18. The light guide plate according to claim 14 wherein the distance between the upper face and the lower face is 0.3-3.0 mm.

19. The light guide plate according to claim 14 wherein an anisotropic diffusion pattern is formed as an integrated body with the lower face.

20. The light guide plate according to claim 14 wherein the anisotropic diffusion pattern is a surface relief hologram.

21. A liquid crystal display device comprising a backlight device using the light guide plate according to claim 14 and liquid crystal display elements illuminated by this backlight device.

22. The backlight device according to claim 2 wherein the reflective elements are formed as an integrated body with the light guide plate.

23. The backlight device according to claim 2 wherein the reflector has reflective grooves disposed on the surface thereof that reflect light emitted from the lower face of the light guide plate to the light guide plate side.

24. The backlight device according to claim 2 wherein the reflector has a metallic film disposed on the surface thereof.

25. The backlight device according to claim 2 wherein the light guide plate is comprised of polymethyl methacrylate, a polyolefin resin, polycarbonate or a compound of these.

26. The backlight device according to claim 2 wherein the distance between the upper face and the lower face of the light guide plate is 0.3-3.0 mm.

27. The backlight device according to claim 2 wherein the reflective elements are formed by disposing a plurality of V-shaped grooves on the upper face of the light guide plate substantially parallel to the entry face.

28. The backlight device according to claim 27 wherein the reflective elements comprise:

a first face that is inclined toward the side of the light guide plate closest to the light source viewed from inside the light guide plate and a second face that is inclined toward the face opposite the light source viewed from inside the light guide plate, and an angle $\theta 1$ formed between the first face and the upper face is 0.2-5° and an angle $\theta 2$ formed between the second face and the upper face is not more than 90°.

29. The backlight device according to claim 2 wherein an anisotropic diffusion pattern is formed as an integrated body with the lower face of the light guide plate.

30. The backlight device according to claim 2 wherein an optical sheet that deflects light emitted from the light guide plate so as to approach traveling direction of light to the direction normal to the upper face of the light guide plate is disposed in a position opposing the upper face of the light guide plate.

* * * * *